(12) United States Patent
Hansson

(10) Patent No.: US 11,742,171 B2
(45) Date of Patent: Aug. 29, 2023

(54) METHOD FOR IMAGING A SAMPLE

(71) Applicant: Excillum AB, Kista (SE)

(72) Inventor: Björn Hansson, Kista (SE)

(73) Assignee: EXCILLUM AB, Kista (SE)

( * ) Notice: Subject to any disclaimer, the term of this patent is extended or adjusted under 35 U.S.C. 154(b) by 9 days.

(21) Appl. No.: 17/625,616

(22) PCT Filed: Jul. 2, 2020

(86) PCT No.: PCT/EP2020/068624
§ 371 (c)(1),
(2) Date: Jan. 7, 2022

(87) PCT Pub. No.: WO2021/008881
PCT Pub. Date: Jan. 21, 2021

(65) Prior Publication Data
US 2022/0262591 A1 Aug. 18, 2022

(30) Foreign Application Priority Data

Jul. 12, 2019 (EP) ..................................... 19186052

(51) Int. Cl.
*H01J 35/30* (2006.01)
*H01J 35/14* (2006.01)
*G01N 23/04* (2018.01)
*H05G 1/52* (2006.01)

(52) U.S. Cl.
CPC .............. *H01J 35/30* (2013.01); *G01N 23/04* (2013.01); *H01J 35/153* (2019.05); *H05G 1/52* (2013.01); *G01N 2223/1016* (2013.01); *G01N 2223/204* (2013.01); *G01N 2223/3301* (2013.01); *G01N 2223/3307* (2013.01)

(58) Field of Classification Search
CPC .......... H01J 35/30; H01J 35/14; H01J 35/153; H01J 35/116; G01N 23/04; G01N 2223/3307; G01N 2223/1016; G01N 2223/204; G01N 2223/3301; G01N 2223/32; H05G 1/52
See application file for complete search history.

(56) References Cited

U.S. PATENT DOCUMENTS

| 5,561,696 A | 10/1996 | Adams et al. |
| 2017/0309436 A1 | 10/2017 | Peterson et al. |

FOREIGN PATENT DOCUMENTS

| DE | 19633860 A1 | 2/1997 |
| EP | 2790015 A1 | 10/2014 |
| WO | 8904477 A1 | 5/1989 |
| WO | 2009136349 A2 | 11/2009 |

OTHER PUBLICATIONS

International Search Report (PCT/ISA/210) and Written Opinion (PCT/ISA/237) dated Sep. 17, 2020, by the European Patent Office as the International Searching Authority for International Application No. PCT/EP2020/068624.

*Primary Examiner* — Jurie Yun
(74) *Attorney, Agent, or Firm* — BUCHANAN, INGERSOLL & ROONEY PC

(57) ABSTRACT

A method for imaging a sample by means of an X-ray detector is disclosed, including providing an electron beam interacting with a target to generate X-ray radiation emitted from an X-ray spot on the target, moving the sample relative to the target, deflecting the electron beam such that the X-ray spot is moved over the target simultaneously and in accordance with the movement of the sample, and detecting X-ray radiation emitted from the X-ray spot and interacting with the sample.

15 Claims, 4 Drawing Sheets

METHOD FOR IMAGING A SAMPLE

TECHNICAL FIELD

The present invention generally relates to a system and a method for imaging samples by means of X-ray radiation.

TECHNICAL BACKGROUND

X-ray imaging is a technology that employs X-ray radiation to retrieve information about samples in for example medical diagnostics and industrial inspection and quality control. Generally, the X-rays from an X-ray spot, created by directing an electron beam to a target, are allowed to impinge on the sample and the interaction between the X-rays and the matter of the sample is observed by means of an X-ray detector. By analysing, for example, the attenuation of the X-ray radiation as is passes through the sample, or the scattering of the X-ray radiation as it interacts with the matter of the sample, information can be retrieved regarding for example composition and structure of the sample.

It is a challenge to acquire an X-ray image of a comparatively large sample with a fine resolution and in a short time. These are the requirements found in many industrial inspection systems. To be able to resolve small features without inducing image blur, a small X-ray spot is required. This is typically achieved by focusing of the electron beam impacting the target. A larger X-ray spot will inevitably induce image blur since X-ray radiation from different parts of the spot will interact with the sample and reach the detector from different angles. However, making the X-ray spot smaller may necessitate a lower X-ray flux, since the electron beam power that can be applied to a smaller spot without risking overheating the target may be smaller than what is possible for a larger spot. Increasing the electron beam power applied to a small spot means increasing the power density, which in turn may cause local damage to the target. The maximum available X-ray flux for a given spot size is generally limited by the maximum thermal load the electron target, which generates the X-ray radiation upon interaction with the electron beam, is capable of handling without overheating and sustaining other thermally induced damages. Thus, as the spot size is decreased, the exposure time may have to be increased to achieve the X-ray dose required from an image quality point of view. Increasing the exposure time will in general increase the total time required to inspect the sample. Thus, it appears that a trade-off between resolution and inspection time must be made.

To achieve sharp images, a straightforward solution is to image the sample while it is not in motion with respect to the X-ray source and the detector. For a sample that is relatively large compared to the field of view of the imaging system, the sample or the imaging system must perform a repeated stepped motion (i.e. start from rest, move to destination, stop, wait for induced vibrations to diminish, and repeat), which will add to the inspection time.

An alternative may be to image the sample while it is in motion with respect to the imaging system. However, to avoid motion induced image blur, the exposure time must be short on a time scale set by the image resolution and the speed of the sample, so that the distance the sample moves during one exposure is negligible compared to the image resolution. As discussed above, an improved resolution may imply a longer exposure time and also a lower speed in order to avoid blurring. A lower speed will also mean a longer inspection time. Again, there seems to be a conflict between resolution and inspection time.

A further option may be to use a plurality of detectors to acquire more information from the sample. The image of the sample may be formed as a sum of images obtained from each detector. However, due to physical constraints each detector will view the same region of the sample from a slightly different angle, which will induce image blur to the resulting image.

Therefore, there is a need for an improved X-ray imaging technology.

SUMMARY

It is an object of the present invention to solve or alleviate the problems described above. More specifically, the invention aims at providing a method and a system for imaging a sample with improved quality and throughput time.

This and other objectives, which will be apparent from the following description, are wholly or partially achieved by the method and the system according to the appended independent claims. The dependent claims define preferred embodiments.

The present invention should not be construed as limited to a particular application or a particular type of sample. On the contrary, the invention may be used with many types of samples where X-ray inspection is desired and in different types of industrial applications. To reap the benefits of the invention, the present disclosure may preferably be used for analysis of samples from which two-dimensional sample information retrieved from two-dimensional data are of particular interest. Such data may be extracted from a two-dimensional X-ray image obtained by providing X-ray radiation from substantially one side of the sample. In some cases, e.g. in laminography applications, a plurality of two-dimensional images of an object obtained from slightly different angles may be combined to provide for some depth information. Samples that require information with a full three-dimensional character may be better suited for tomography imaging, in which X-ray radiation is provided from a plurality of directions and a full three-dimensional image of the sample is reconstructed. The present application seeks to describe and protect the limitations imposed on the X-ray source as such to achieve the desired inspection objectives, i.e. to provide high resolution, high quality images of large objects within a short time. Particular types of samples may require adaptions of different imaging system components, e.g. sample holder and detector, but an X-ray source according to the present invention may still be applicable.

Generally, the present invention provides a technology that can be employed for imaging a sample by means of X-ray radiation that is generated upon interaction between an electron beam and a target. The X-ray radiation may be directed towards the sample and detected by means of a detector.

The electron beam may be deflected relative the target such that the X-ray spot, from which the X-ray radiation is emitted from the target, can be moved accordingly. The movement of the X-ray spot can be related to a movement of the sample. Various examples of such relations are the object of embodiments described in this disclosure. Examples include coordinating the movement of the X-ray spot over the target with at least a part of the movement described by the sample, such that an image of the sample, as projected on the detector, does not move on the detector. Further examples include synchronizing the movement of the X-ray spot and the sample for a certain time period, such as for example a scan of the electron beam over the target, and moving the X-ray spot over the target simultaneously and in accordance with a movement of the sample.

Accordingly, in an aspect, a method for imaging a sample by means of an X-ray detector is provided, wherein the method comprises providing an electron beam interacting with a target to generate X-ray radiation emitted from an X-ray spot on the target, moving the sample relative to the target, deflecting the electron beam such that the X-ray spot is moved over the target in accordance with the movement of the sample, and detecting X-ray radiation emitted from the X-ray spot and interacting with the sample. Preferably, the X-ray spot is moved simultaneously with at least a portion of the movement described by the sample.

In an aspect, a method for imaging a sample is provided, comprising providing an electron beam interacting with a target to generate X-ray radiation emitted from an X-ray spot on the target, providing a detector arranged for receiving X-ray radiation generated at the target and passing through the sample, moving the sample relative to the target, and deflecting the electron beam such that an image of an inspection region on the sample does not move relative to the detector.

In an aspect, an X-ray source for inspecting a moving sample is provided, comprising a target, an electron source, an electron optical system, and a controller. The electron source is configured to provide an electron beam interacting with the target to generate X-ray radiation emitted from an X-ray spot on the target, whereas the electron optical system is configured to deflect the electron beam so as to move the X-ray spot on the target. The controller is operably connected to the electron optical system and configured to deflect the electron beam by means of the electron optical system and based on a signal indicative of the movement of the sample, such that the X-ray spot is moved on the target based on the movement of the sample. Preferably, the X-ray spot is moved on the target in accordance with the movement of the sample, and, in some examples, simultaneously with the movement of the sample during at least a part of the motion described by the sample. The signal indicative of the movement of the sample may, in some embodiments, simply be information about speed and direction of the sample movement. If the movement of the sample is linear at a constant speed, then no further input may be required once a start trigger for the sample movement has been provided.

In an aspect, the invention provides an imaging system for imaging a sample by means of an X-ray detector, wherein the system comprises a target, an electron source, a sample holder and an electron optical system. The electron source is configured to provide an electron beam interacting with the target to generate X-ray radiation emitted from an X-ray spot on the target, whereas the sample holder is configured to move the sample relative to the target and the electron optical system is configured to deflect the electron beam such that the X-ray spot is moved on the target in accordance with the movement of the sample.

In general, the invention addresses the trade-off challenge between resolution and exposure time as described above and proposes a technology in which the X-ray illumination on the sample may be moved in accordance with the sample during a certain period of time. As a result, the X-ray illumination on the sample may be fixed at or impinge on or within a fixed location on the sample, for at least a part of the relative movement of the sample and the X-ray spot. Put differently, the movement of the X-ray spot may be coordinated with a movement of the sample for a non-zero time span, such that the X-ray illumination follows the sample for at least the non-zero time span. To avoid motion induced blurring of the generated image the motion of the sample and the X-ray spot may be coordinated in such a fashion so as to create an image of the inspection region on the detector that does not move relative to the detector while the sample and the X-ray spot are moved.

Several advantages can be noted. Firstly, this technology allows for the exposure time of a particular inspection location of the sample to be increased as the X-ray illumination on the sample is moved along with the sample. Secondly, the use of an increased exposure time makes it possible to use a reduced power density, which in turn reduces the risk of overheating of the X-ray source and in particular the electron target of the X-ray source. Thirdly, deflecting the electron beam such that the X-ray spot is moved on the target reduces the risk for local overheating of the target material and makes it possible to increase the power density of the electron beam. Fourthly, moving the sample relative to the target allows for a plurality of inspection locations on the sample to be imaged in a sequential manner. In other words, this technology makes it possible to image samples having a size that exceeds the field of view of the X-ray source and the detector. Fifthly, being able to coordinate the motion of the X-ray spot on the target and the movement of the sample such that the relative motion between an image of the sample on the detector and the detector itself is reduced, or such that the image is substantially fixed on the detector, may reduce the motion induce noise and blurring of the image acquired by the detector.

The invention makes use of the realisation that an electron optical system generally can be used to cause a relative movement between the electron beam and the target at a higher speed and precision than what would be possible to achieve by mechanical means. Mechanically induced movement is often limited by the inertia and the engineering tolerances of the involved parts, whereas electron optical systems tends to be capable of deflecting the electron beam without requiring any substantial movement of mechanical parts. This allows for the position of the electron beam on the target and, consequently, the X-ray spot from which the X-ray radiation is emitted from the target, to be controlled by the electron optical system. The motion of the X-ray spot on the target may for example be controlled such that the resulting X-ray illumination on the sample follows a motion of the sample. Due to the above mentioned challenges with obtaining a precise mechanical movement, the sample holder may in some examples be configured to move the sample in a substantially continuous manner during a measurement sequence, whereas the electron optical system may be configured to repeatedly move the X-ray spot back and forth on the target a plurality of times during the same measurement sequence. Thus, the measurement sequence may comprise a plurality of exposures, wherein, for each exposure, the X-ray spot may be moved over the target in a forward direction such that the illumination follows a specific inspection location on the sample, and rapidly moved back to a starting position on the target before the next exposure of another inspection location on the sample is initiated. In some embodiments, it may be preferred to blank the electron beam during the movement back to the starting position such that no X-ray radiation is generated during this stage. The X-ray spot would then correspond to the spot where X-ray radiation would have been generated, had the electron beam not been blanked.

Prior art technologies, where the advantages of moving the X-ray spot on the target in accordance with a motion of the sample have not been realized, may have to resort to moving the sample and the entire X-ray source in relation to each other in a stepwise fashion to perform inspection of a sample that is larger than the available field of view of the inspection system. This technology is inherently limited by mechanical limitations on accelerating and decelerating a massive object. Typically, ample time must be allowed for starting, moving, stopping, and waiting for induced vibrations to diminish, leading to a prolonged inspection time. If, in an attempt to reduce the inspection time, images are acquired before the sample and X-ray source has come to rest in relation to each other, remaining vibrations may lead to image blurring. The present invention is advantageous in the sense that it allows for the sample to move in a continuous fashion during the inspection while the electron beam is repeatedly scanned over the target, thus providing for sharp images of the entire sample in a comparatively short time. Further, the present invention is advantageous over prior art technologies in which the illumination is scanned in a continuous manner motion on a stationary sample (or the sample is scanned in relation to a stationary X-ray source), since the present invention allows for an increased exposure time at each inspection location. To alleviate this problem, some prior art solutions comprise a plurality of detectors that are used for repeatedly imaging the sample. The image of the sample may be formed as a sum of images obtained from each detector. However, due to physical constraints each detector will view the same region of the sample from a slightly different angle, which will induce image blur to the resulting image. The present invention resolves this drawback by moving the X-ray spot in accordance with the sample in such a way as to illuminate each inspection region on the sample from the same angle when image data is recorded by each detector. Furthermore, if the sample is scanned in relation to a fixed X-ray source the image may move on the detector with a velocity that is scaled by the image magnification in relation to the sample velocity. On the other hand, if the X-ray spot is moved according to the present invention the image velocity on the detector may equal the sample velocity. This may provide for somewhat relaxed requirements on the read out speed of the detector.

Thus, according to an embodiment, the electron optical system may be configured to move the electron beam back and forth over the target in a plurality of scans, whereas the sample holder is configured to move the sample in a substantial continuous movement during one or several repeated scan(s) of the electron beam. It may be preferred in some embodiments to control the electron beam during the backward motion thereof such that no X-ray radiation is generated at this stage, for example by blanking the electron beam or otherwise preventing the electron beam from interacting with the target.

According to an embodiment, the imaging system may be configured to coordinate the movement of the electron beam and the movement of the sample such that the X-ray illumination, during a scan of the electron beam, follows a specific position on the sample in such a way that this position is projected onto a fixed location on the detector. Put differently, the movement of the electron beam and the sample may be coordinated such that, during a scan, there is no or substantially no relative motion between the image of the sample and the detector.

As used herein, the term "exposure time" is generally understood as the time span for which a region of the sample is exposed to the X-ray radiation used for performing the imaging. Put differently, the exposure time may refer to the time span during which the detector records the X-ray radiation interacting with the sample.

The term "inspection region" or "inspection location" generally refers to a physical location or region on the sample which is to be inspected, preferably during a single scan of the electron beam over the target. A measurement sequence may thus comprise measurements of a plurality of inspection regions on the sample.

It will be understood that the inspection regions may be overlapping each other, be arranged side by side, or physically separated from each other.

The size, or area of an inspection region may in some examples be defined by the field of view of the X-ray source and the detector. The size of an inspection region may for example be equal to the size of the field of view.

The electron beam and the X-ray radiation may be considered to deliver a certain power to the target and the sample, respectively. The power, known to be defined as total amount of energy delivered to the target (or sample) per unit time, may be determined by the energy, and total number (or flux), of electrons delivered to the target per unit time (or photons delivered to the sample per unit time). The delivered power per unit area of the target (or sample) may be referred to as power density and may be considered to represent an average power per unit area of electron spot region on the target, or X-ray illumination on the sample.

The X-ray spot, or region of interest with respect to the generation of X-rays, may refer to a surface on the target wherefrom X-ray radiation is emitted. The X-ray spot may be defined by an electron beam spot on the target, a geometry of the target, and/or orientation of the target relative the electron beam.

By "target" is generally meant an anode that is capable of generating X-ray radiation upon interaction with an electron beam. Different types of targets may be employed in the context of the present invention. The target may for example be a transmission target, which is thin enough to allow X-rays to pass through the target, or a reflection target in which the X-rays are emitted from the same side as the one on which the electron beam impinges. Thus, the target may either be of a type allowing the X-ray spot and the electron spot to be located on the same side or on opposite sides of the target. The size of the X-ray spot may be considered to be limited by the field of view of an X-ray optical element employed to receive the X-rays, and/or the field of view of the detector.

Further, the target may be a so-called liquid target, for example formed of a jet of liquid metal, or a solid target. The solid target may be of a stationary type, or a rotating type.

For the purpose of the appended claims, a "detector" or "sensor" may refer to any means suitable for detecting the presence (and, if applicable, power or intensity) of X-ray radiation impinging on the detector. It may also refer to a portion of such detector. To mention a few examples, the detector may be a charge-sensitive area, a scintillator combined with a light sensor, or a luminescent material combined with a light sensor. The detector may be a direct detector where electron-hole pairs created by interaction between X-ray photons and a semiconductor are collected. The detector may be an indirect detector where a scintillator is used to convert the X-ray radiation to visible light which may be detected by a CCD or a CMOS sensor. In some embodiments the detector may be a line-scan detector or a time delay integration, TDI, detector. The TDI detector may comprise a plurality of linear detector arrays over which the sample may be scanned such that, as the image of the sample moves from one detector line to the next, the integrated charge moves along with the image to provide an increased resolution.

The detector may form part of the system as defined in the appended independent claim, or form part of a separate entity. Further, the detector may be stationary relative the target, or movable. In some examples, the detector may move along with the motion of the sample, such that it for example follows the motion of the inspection region as projected on the detector.

Data may be read from the detector at least once per scan performed by the electron beam. Preferably, the imaging system may be arranged so that detector readings contain data from only one scan. In an embodiment, data may be read from the detector in between scans, i.e. when the electron beam is moved from the end position of one scan to the start position of the next scan. The detector may pose a lower limit on the allowed time between scans in case the time required to read data from the detector is longer than the time required to move the electron beam from the end position of one scan to the start position of the next scan. In such case, the X-ray system may be controlled such that the next scan is not initiated until the detector is in a condition where it can start recording data again. In an embodiment, consecutive inspection regions are arranged to overlap to ensure that all or substantially all locations of the sample are inspected even though the detector cannot record data at all times.

According to an embodiment, the imaging system may further comprise a position sensor arranged to provide data indicating the movement or position of the sample, and a controller arranged to adjust the deflection of the electron beam based on the sensor data. This allows for the movement of the sample to be monitored, and for the movement of the X-ray spot to be controlled or at least adjusted based on the monitored movement of the sample.

According to an embodiment, the sample holder may comprise a reference feature configured to be detected by the position sensor. The reference feature may for example be a structure or geometrical distinct region capable of generating a contrast in a signal resulting from an interaction with X-ray radiation. Thus, the position sensor may in an embodiment be configured to detect X-ray radiation interacting with the reference feature. In an embodiment, the position sensor may be formed of the detector used for imaging the sample. The imaging system may be configured to adjust the movement of the electron beam so that the image of the reference feature formed on the detector does not move relative to the detector during a scan.

According to an embodiment, the position sensor may comprise at least one of the following elements: an optical sensor, a magnetic sensor, an inductive sensor, a capacitive sensor, and a laser interferometer.

According to an embodiment, the electron beam may be moved in accordance with the movement of the sample in such a fashion as to not impinge on the target all the time. The electron beam may be arranged to impinge on the target briefly, thus creating an X-ray spot, and the remaining time be directed to a location where no X-ray radiation interacting with the sample and reaching the detector is created. Put differently, an X-ray flash may be generated. This location may be arranged as a part of the target or be arranged separate from the target. This embodiment is advantageous in cases where the required exposure time is short, measured on a time scale defined by the motion of the sample and the resolution of the imaging system. Provided that a dose sufficient to create an image with required signal-to-noise ratio may be provided in a time short enough to not create motion blurring, this embodiment may provide an alternative where the requirements on moving the sample holder in a controlled manner may be somewhat relaxed. In this case unintended variations in the velocity of the sample holder may give negligible contributions to image blur. This embodiment may furthermore comprise a liquid target which may risk vaporizing if the thermal load is above some threshold but has the ability to regenerate a new target surface in time for the next exposure.

The technology disclosed may be embodied as computer readable instructions for controlling a programmable computer in such manner that it causes an X-ray system to perform the methods outlined above. Such instructions may be distributed in the form of a computer-program product comprising a non-volatile computer-readable medium storing the instructions.

It will be appreciated that any of the features in the embodiments described above for the method according to the first aspect above may be combined with the methods according to the second and third aspects of the present invention, and vice versa.

Further objectives of, features of, and advantages with the present invention will become apparent when studying the following detailed disclosure, the drawings and the appended claims. Those skilled in the art will realize that different features of the present invention can be combined to create embodiments other that those described in the following

BRIEF DESCRIPTION OF THE DRAWINGS

The invention will now be described for the purpose of exemplification with reference to the accompanying drawings, on which.

All figures are schematic, not necessarily to scale, and generally only show parts that are necessary in order to elucidate the invention, wherein other parts may be omitted or merely suggested

DETAILED DESCRIPTION OF EMBODIMENTS

Figure 1:
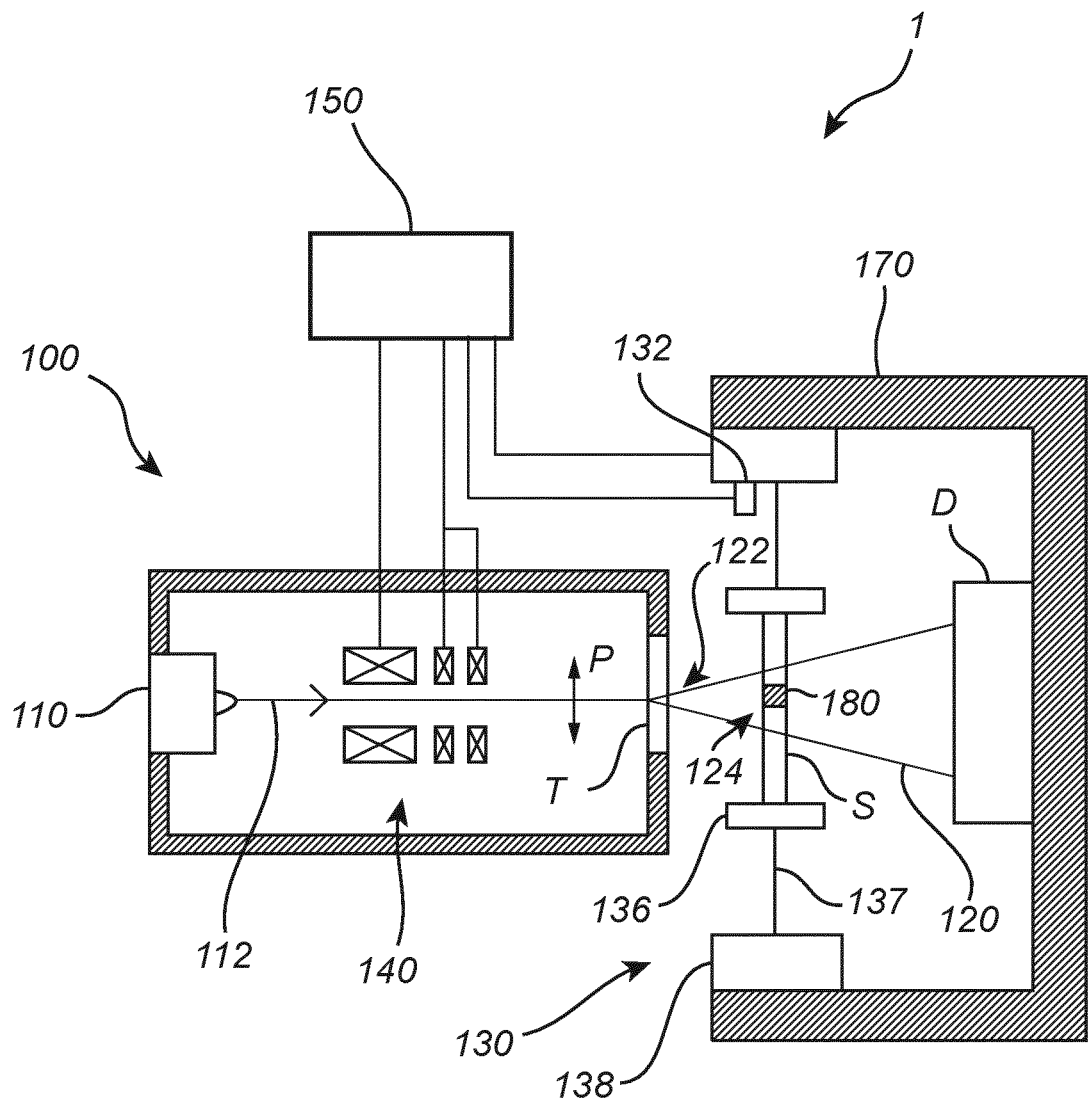
FIG. 1 is a schematic, cross sectional side view of an imaging system according to some embodiments of the present invention.

Referring now to FIG. 1, a cross sectional side view of an imaging system 1 according to some embodiments of the present invention is illustrated.

The imaging system 1 comprises an X-ray source 100 having an electron source 110 for generating an electron beam 112. The electron source 110 may for example comprise a cathode, which is powered by a power supply (not shown) and includes an electron emitter, such as a thermal-field or cold-field charged particle source. Typically, the electron energy of the generated electron beam 112 may range from about 5 keV to about 500 keV. The electron beam 112 generated by the electron source 110 may be accelerated towards an accelerating aperture, after which it enters an electron optical system 140 for controlling the direction of the electron beam 112. The electron optical system 140 may for example comprise deflection plates and/or an arrangement of electrostatic aligning plates and electromagnetic lenses. Variable properties of the electron optical system 140 may be controllable by signals provided by a controller 150. In the illustrated example, the electron optical system 140 is operable to deflect the electron beam 112 at least in the directions indicated by the arrow P, such that the electron beam 112 can be scanned in at least one dimension over the target T.

Downstream of the electron optical system 140, an outgoing electron beam 112 may intersect a target T for generating X-ray radiation upon the interaction with the electron beam 112. The target may for example be a tungsten target and may be of a thickness that allows it to operate as a transmission target. As indicated in FIG. 1, the electron beam may impinge in one surface of the target T, i.e., the surface facing the electron source 110 and the electron optical system 140, whereas the outgoing X-ray radiation 120 may be emitted from the target T from the opposite side. As a result, the X-ray radiation 120 may be emitted in substantially the same direction as the electron beam 112.

The region of the target T in which the electron beam impinges the surface of the target T may be referred to as the electron spot formed on the target T. Further, the region of the surface of the target T from which the outgoing X-ray radiation 120 is emitted may be referred to as the X-ray spot 122 on the target. The electron optical system 140 may further be operable to focus the electron beam on the target to set the size of the electron spot, which in turn will determine the size of the X-ray spot. In the present example, the position of the X-ray spot 122 may be varied by moving the position of the electron spot on the opposing surface of the target T. Thus, by scanning the electron beam over the target T, the X-ray spot 122 may be scanned accordingly. It is noted that it generally is much easier to move the X-ray spot by means of the electron optical system, than by moving the entire X-ray source 100.

The X-ray radiation 120, emitted from the X-ray spot 122 on the target T, may then propagate towards a sample S that may be positioned in a downstream direction of the X-ray source 100 and between the target T and a detector D for receiving the X-ray radiation 120 interacting with, or at least passing through the sample S. The sample may thus be arranged such that it can be illuminated by the X-ray radiation for a certain time span, which also may be referred to as exposure time.

The sample S may be arranged in a sample holder 130 for controlling a position of the sample S relative the target T. Preferably, the sample holder 130 is configured to move the sample S relative to the target T such that the X-ray radiation 120 emitted from the target T can be brought to impinge on different locations on the sample S. The regions of interest on the sample S, i.e., the regions to be inspected or imaged, may be referred to as inspection regions or inspection locations. By moving the sample S relative the target T, different inspection regions may be exposed by the X-ray radiation 120. Thus, it is possible to image samples that are larger than a field of view of the X-ray source 100 and the detector D.

The detector D, which may be arranged downstream of the sample S so as to receive X-ray radiation 120 passing through the sample S, may comprise an area image sensor (CCD or CMOS) and a scintillator. The image sensor may be coupled to a fibre optic plate with a scintillator (FOS). The detector may comprise a flat panel sensor with additional functionality integrated on the sensor chip. Data may be retrieved from the detector either directly or after some internal processing, e.g. time delay integration (TDI). In the present embodiment, the detector D may be fixed relative to the target T. It is however appreciated that the detector D may be movable or adjustable as well, allowing it to be shifted in relation to the X-ray radiation to be detected. In certain embodiments it may be advantageous to provide a detector with the capability to shift the obtained data in accordance with the sample movement. This will effectively correspond to repeatedly image one part of the sample. Thus, instead of moving the detector the image data is moved on the detector. When the X-ray radiation 120 impinges on the detector, it may form an X-ray projection of the inspection region of the sample S on the detector D.

Additionally, a position sensor 132 may be employed to detect the position and/or movement of the sample S. The position sensor 132 may for example comprise an inductive sensor or an optical sensor such as for example a laser interferometer, which may measure the position of a reference surface of the holder relative the position of the sensor. The resulting sensor signal may be used as feedback or input for controlling the operation of the system, and in particular the operation of the electron optical system, controlling the deflection of the electron beam 112 on the target T, and the sample holder 130 controlling the position of the sample S. The controlling operations and processes may be performed by a controller 150, which may be operably connected, by wire or wirelessly, to the rest of the system 1. A signal received by the controller indicative of the motion of the sample may be of different character depending on the level of control required. In some embodiments an index pulse indicating the start of a continuous motion of the sample or indicating that the sample is at a known position may be sufficient. Other embodiments may comprise an input signal corresponding to the position or the velocity of the sample. The X-ray source may comprise an input port communicatively connected to the controller and arranged for receiving the input signal indicative of the sample position. Alternatively, there is no feedback connection between the position sensor 132 and the electron optical system 140 during the imaging. In that case, the sample holder 130 may be configured to move the sample S according to a predetermined scheme, and the electron optical system 140 configured to move the X-ray spot according to another predetermined scheme. The schemes may be determined for example in a calibration process. The signal indicative of the sample position may be a signal indicating speed and direction of the sample movement, which may be constant.

In a preferred example embodiment, the electron optical system 140 may be operated such that the electron beam 112 is deflected in a vertical direction (with reference to the orientation of the paper of the figure) over the target T. Moving the electron beam from a lower position to an upper position on the target surface may be referred to as a single scan. As a result, the X-ray spot 122 generated by the electron beam 112 may be scanned accordingly over the target T. For a stationary sample S, that is, a sample having a fixed position relative to the target T, the deflection of the electron beam 112 over the target T will result in the sample S being scanned accordingly by the X-ray radiation 120. Thus, a plurality of inspection regions, or an enlarged inspection region, may be imaged by means of the detector D.

However, in some embodiments, the sample S may be moved in accordance with the movement of the X-ray spot 122 or vice versa. Preferably, the movement of the sample S and the movement of the X-ray spot may be coordinated such that the resulting X-ray radiation 120 is following the inspection region on the sample S. Thus, the electron optical system 140 and the sample holder 130 may be operated such that the X-ray illumination 124 generated by the X-ray radiation 120 on the sample is substantially fixed relative the sample during a scan of the electron beam 112. As a consequence, a certain region of the sample S may be exposed to X-ray radiation during an increased exposure time.

The electron optical system 140 may be configured to allow the X-ray illumination 124 to follow the motion of the sample during an entire scan of the electron beam. Thus, if the sample follows a substantially continuous path, preferably with a constant speed, the electron beam may be moved accordingly. However, since the target T has a finite length (as seen in the scanning direction), the scan has to be terminated when the electron beam reaches an end position on the target surface. The electron beam may be considered to have a deflection range having two endpoints that may be defined by physical and/or geometrical constraints. When an end position has been reached, the electron optical system may return the electron spot to an initial position, that may represent the other end point of the deflection range. The returning motion may be performed at a speed that is higher than the scanning speed so as to reduce the time the system is not capable of producing image data and, in case of a sample that continues its movement also during the return of the electron spot, to reduce the distance the sample S travels during the return motion of the electron spot. In some embodiments, it may be preferred to blank the electron beam during the return motion such that no X-ray radiation is generated during this stage.

The sample holder 130 may comprise a stage supporting the sample. The stage may for example be formed of a plate or a frame for providing mechanical support to the sample while allowing X-ray radiation to pass through the sample S and towards the detector D. Further, attachment means, such as a clamp 136, may be provided for fixating the sample S to the stage. As shown in the present example of FIG. 1, the sample holder 130 may comprise a guiding means, such as a guide rail 137, along which the sample may be moved back and forth relative the target T. The motion of the sample along the guide rail 137 may be realised by means of a motor 138, which may be controlled by the controller 150.

The sample holder 130 may be mounted in a housing 170 providing mechanical support and stability to the mechanical movement of the sample S. The detector D may in some embodiments be mounted in the same housing 170, so as to facilitate alignment and relative positioning of the detector D and sample holder 130.

Figure 2:
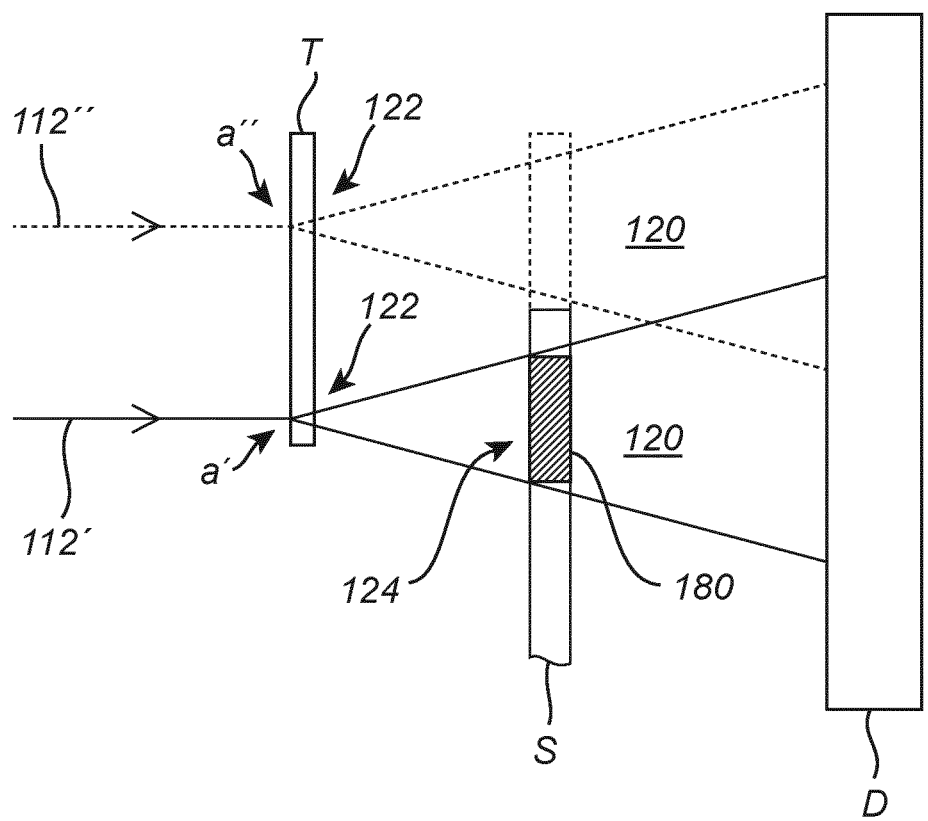
FIG. 2 is a schematic, perspective view of a target, a sample and a detector according to some embodiments.

FIG. 2 is a schematic cross section of a portion of an imaging system similar to the system disclosed in FIG. 1. In the present figure, the target T, sample S and the detector D of an exemplary system are disclosed. The electron beam may be deflected over a deflection range that is limited by a first end point a' and a second end point a". In FIG. 2, the first endpoint a' is illustrated by the position of the electron beam as drawn with solid line 112', whereas the second endpoint a" of the deflection range is illustrated by the electron beam as drawn with dashed line 112". As a consequence, the electron spot on the target T will be formed on different positions on the target, causing the X-ray spot to be formed on different positions on the target T accordingly. By moving the sample accordingly, preferably such that the position in which the X-ray radiation impinges on the sample S is the same during the entire deflection range, the exposure time at that position of the sample may be extended to last during the deflection over the entire range. This situation is illustrated in FIG. 2, in which the sample position, and thus the inspection region 180 on the sample S, is indicated by solid lines when the electron beam is arranged in the first endpoint of the deflection range and by dashed lines when the electron beam is in the second endpoint of the deflection range. In the present example, the detector D is stationary with respect to the target T, such that the X-ray projection will impinge on different positions on the detector D in the respective endpoints of the deflection range. It will however be appreciated that the detector D may be configured to move as well, such that it for example may follow, or at least partly follow, the movement of the sample and/or the X-ray projection as projected on an image plane of the detector. In embodiments with a stationary detector data obtained from different parts of the detector at different times corresponding to the same inspection region may be combined to form the final image. This may be realized by reading out data from the detector at a rate corresponding to the time required to move the sample a distance corresponding to a pixel size of the detector. Lower read out rates may be used provided the induced image blur is acceptable for the particular application. An alternative may be to perform time delayed integration on a sensor chip comprised within the detector, in this case the image data is accumulated and moved on the sensor chip with the same speed as the image moves over the sensor. In embodiments where the X-ray spot is, at least for a part of the time, moved with substantially the same velocity as the sample, the image may move on the detector with substantially the same velocity as the sample irrespective of the magnification.

In an embodiment, the sample may be moved in a plurality of continuous scanning motions along a first direction, preferably the direction of deflection of the electron beam, to produce a sequence of measurements, and between each continuous scanning motion be moved in a stepwise manner in a second direction, preferably orthogonal to the first direction. In this way, a relatively large sample may be inspected with a relatively high resolution and at a relatively high speed, while subjecting the object to a reduced number of accelerations and decelerations.

Figure 3:
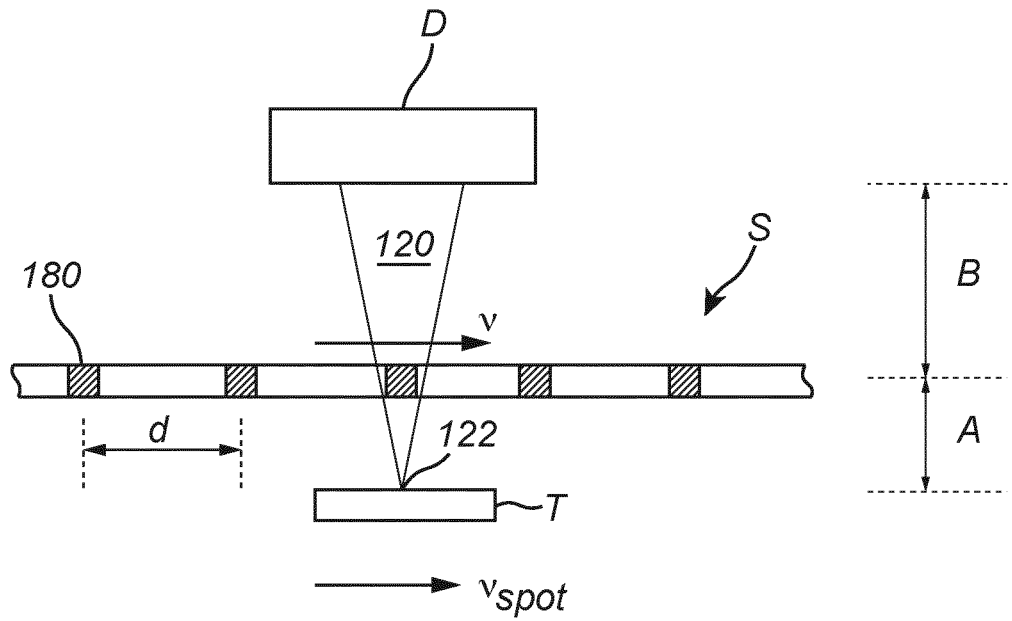
FIG. 3 is a schematic illustration of a target, a sample and a detector of an imaging system according to some embodiments of the present invention.

Various movement schemes of the X-ray spot and the sample, and imaging methods based on such movements, will now be discussed in more detail with reference to exemplary assumptions and calculations. Additionally, reference is made to FIG. 3, illustrating possible relations between the target T, sample S and detector D.

If the sample S moves with a velocity v and comprises inspection locations 180 that are separated by the distance d, the X-ray spot 122 may be moved with a constant velocity for an integration time $t_i$ (also referred to as exposure time). Further, the X-ray spot 122 may be moved in an opposite direction with a velocity $v_{tr}$ for a transport time $t_{tr}$ (as the electron beam, and thus the X-ray spot 122, is returned back from one endpoint of the deflection range to the other endpoint). Preferably, the sum of the integration time $t_i$ and the transport time $t_{tr}$ is less than or equal to the time required for the sample S to move the distance d. Considering that the distance the X-ray spot 122 is moved on the target T when moving along with the sample S is equal to the distance the X-ray spot 122 is moved in the opposite direction when returned, the following notation can be established:

$$t_i v = t_{tr} v_{tr} \Longrightarrow t_{tr} = t_i \frac{v}{v_{tr}}$$

From this, we can see that the transport time $t_{tr}$ will be relatively short provided that the X-ray spot 122 can be moved at a relatively high velocity during the return, i.e., between scans. Since the motion of the X-ray spot 122 is caused by deflecting the electron beam, the return motion can be performed at a very high velocity compared to the velocity for mechanically moving the sample S. Furthermore, since the sum of the time for moving the X-ray spot 122 along with the sample S and back preferably should be less than the time required to move the sample S between two inspection locations 180, the following relations can be established:

$$t_i + t_{tr} = t_i\left(1 + \frac{v}{v_{tr}}\right) \le \frac{d}{v}$$

$$t_i \le \frac{d}{v\left(1 + \frac{v}{v_{tr}}\right)}$$

This means that for a given sample S moved with a certain velocity v, there will be an upper limit for the integration time $t_i$. If the velocity $v_{tr}$ is relatively large compared to the motion velocity of the sample S, the second term in the denominator may be neglected and the integration time $t_i$ be set equal to the time required for moving the sample S. On the other hand, if the integration time $t_i$ is considered as the limiting factor, the inequality can be solved for v:

$$v \le -\frac{v_{tr}}{2} + \sqrt{\frac{v_{tr}^2}{4} + \frac{dv_{tr}}{t_i}} = \frac{v_{tr}}{2}\left(-1 + \sqrt{1 + \frac{4d}{v_{tr}t_i}}\right) \approx \frac{d}{t_i}$$

where the approximation is obtained during the condition mentioned above.

Several embodiments are possible, which differ in if and how the detector D is moved.

In an embodiment, the detector D may be fixed relative to the target T, and the scanning of the X-ray spot be adjusted so that the image of each inspection location 180 does not move on the detector for the duration of the scan. This implies that the distance the X-ray spot 122 moves on the target is slightly longer than the distance the inspection location 180 moves. A schematic illustration of this is provided in FIG. 3, where A is the distance from the X-ray spot on the target to the sample S and B is the distance from the sample S to the detector D.

For the image not to move on the detector D means that at the start of the scan the X-ray spot 122 should be slightly behind (as seen in the direction of sample motion) the inspection location 180, halfway through the scan the X-ray spot 122 should be aligned with the inspection location 180, and at the end of the scan the X-ray spot 122 should be slightly ahead of the inspection location 180. This is further illustrated by the time series depicted in FIGS. 4a-4c, where in FIG. 4a the X-ray spot 122 is positioned slightly to the left of the inspection location 180, whereas in FIG. 4b they are vertically aligned, and in FIG. 4c the X-ray spot 122 is positioned slightly to the right of the inspection location 180. This means that the X-ray spot should move with a higher velocity ($v_{spot}$) than the object's velocity (v) during the integration time ($t_i$). By considering congruent triangles, we may write:

$$\frac{t_i v_{spot}}{A + B} = \frac{t_i v}{B}$$

$$v_{spot} = \frac{A + B}{B} v$$

Figure 4A:
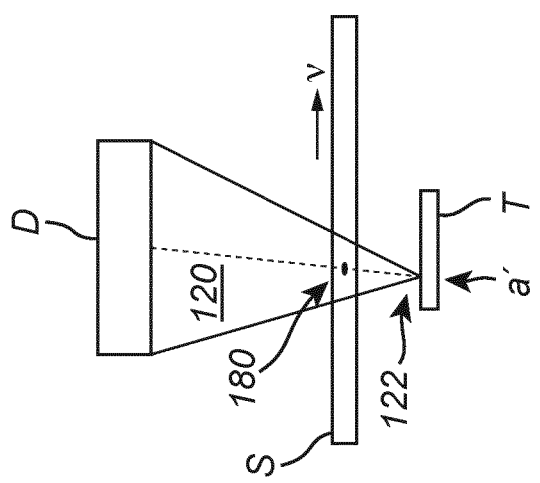
FIGS. 4*a-c* are a schematic illustration of the relative motion of an X-ray spot and a sample according to an embodiment.
Figure 4B:
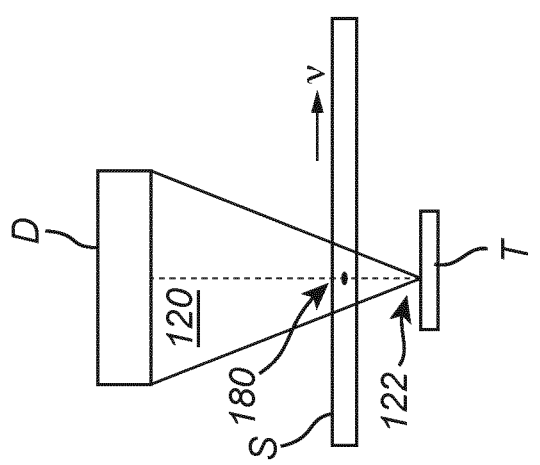
Figure 4C:
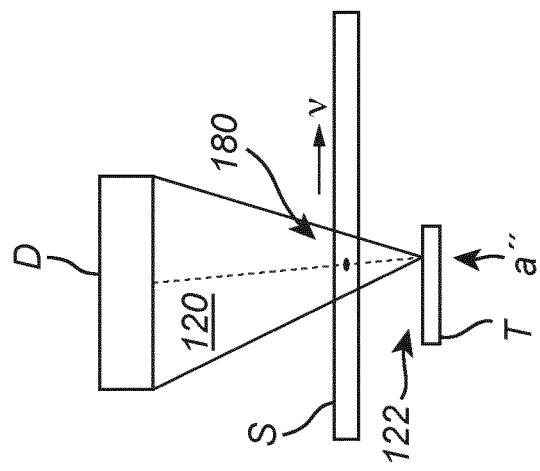

FIGS. 4a-c schematically illustrate an imaging system similar to the one of FIG. 3, performing an imaging method in which the X-ray spot 122 and the sample S are moved such that the image of the inspection region 180 of the sample S, as projected on the detector D, does not move on the detector D when the X-ray spot 122 is moved from the first endpoint a' on the target T (FIG. 4a) to the second endpoint a'' (FIG. 4c) on the target T. The endpoints a', a'' may be considered to represent endpoints of the deflection range in which the electron optical system may be configured to deflect the electron beam (not shown). In the present embodiment, the detector D may be stationary with respect to the target T. As a consequence, the inspection region 180 may be projected at different angles on the image plane of the detector D during an exposure. In FIGS. 4a and 4c, the X-ray spot 122 is located in the endpoints a', a'' of the deflection range, resulting in an oblique projection of the inspection region on the detector D, whereas in FIG. 4b is illustrated a situation in which the X-ray spot 122, the inspection region 180 and the detector D are aligned with a normal to the image plane of the detector.

In some cases, particularly when the sample thickness results in unacceptable blurring when exposed from slightly different angles as discussed above in connection with FIGS. 4a-4c, embodiments comprising a moving detector may be preferred. In an example of such an embodiment the detector is arranged to move synchronously with the sample. The X-ray spot may be moved with the same velocity as the sample and the detector along the direction of motion of the sample, and with a higher velocity in the other direction. Thus, the X-ray spot may follow the sample and the detector for one scan length (corresponding to the positions a' and a'' in FIG. 2) and then return to the start position a' to perform next scan. In this way the inspection region 180 may be projected at substantially the same angle on the image plane of the detector D during an exposure. This embodiment may enhance image quality, but it may require a larger detector to accommodate exposures covering the entire sample. Furthermore, this embodiment may require means for moving the detector together or synchronously with the sample.

In an embodiment, the detector D may be moved along with the motion of the sample S. This may provide for a substantially constant viewing angle during each scan but would however require a detector D with a relatively large field of view in order to accommodate the entire image. Provided it is acceptable to view different inspection locations 180 at different angles a detector with a smaller field of view may be used. In this case the X-ray spot 122 may be moved so that image of each inspection location 180 does not move relative to the detector during each scan and furthermore the viewing angle is maintained substantially constant during each scan. Successive scans may however be performed with different viewing angles for different inspection locations 180.

To ensure that scanning of the X-ray spot 122 conforms with the actual movement of the sample S, a feedback loop may be provided. The motion of the X-ray spot 122 would then be adjusted based on the measured motion of the sample or the sample holder (not shown). This gives the advantage that errors occurring in the movement of the sample S may be compensated for. Otherwise the recorded image may be plagued with artefacts, e.g. a feature may be perceived as longer in the travel direction than it actually is. Furthermore, an active feedback may enable more complex motion patterns if for example different parts of the sample require different integration times.

In an embodiment the detector may be fixed and image data accumulated and shifted in accordance with sample movement as the X-ray spot follows the sample motion. In this way the inspection region 180 may be projected at substantially the same angle on the image plane of the detector during an exposure. In yet another embodiment image data are extracted from the detector at a rate corresponding to the time required for the image to move one pixel in the image plane. Thus, the image produced during one scan will be the sum of a series of images, each somewhat shifted with respect to the detector, acquired while the sample and the X-ray spot move synchronously with each other. In a further embodiment the X-ray spot may be scanned over the target in a stepwise fashion so that during each step the projection of an inspection region on the sample on the detector is substantially fixed with respect to the detector and the next scanning step is started with an offset from the previous step corresponding to the movement of the sample during the previous step. In this way the viewing angle of the inspection region will be substantially the same for each step. The sample may still be moved in a continuous fashion and the length of the scanning steps may be selected so that the sample motion corresponds to a pixel size of the detector. Thus, by selecting the scanning speed so that projection on the detector does not move during one of the scanning steps, pixel blurring may be avoided. Put in a different way, the average velocity of the X-ray spot will be substantially equal to the velocity of the sample while the scanning velocity of the X-ray spot will be higher by a factor given by the distance between the target and the detector divided by the distance between the target and the sample, as discussed above. When the X-ray spot has reached the end of the available scanning range, it may be returned to the beginning of the available scanning range and the process may be resumed.

FIGS. 4a-c illustrate the relative position of the inspection region 180, detector D and target T as the sample moves with a substantially constant velocity v during an exposure of the inspection region. Thus, the exposure time may be defined as the time it takes for the electron beam to perform a scan from endpoint a' to endpoint a'' on the target T. By returning the electron spot to the first endpoint a', a second exposure may be performed, preferably on another inspection region of the sample. The position of the subsequent inspection region may be determined by the movement of the sample. In case the sample continues the motion from the previous scan, the subsequent inspection region may be arranged next to the previous inspection region, as seen in the direction of movement of the sample S (and the X-ray spot 122). However, it will be appreciated that the sample S may be moved in other directions as well, depending on the location of the next region to be imaged.

Figure 5:
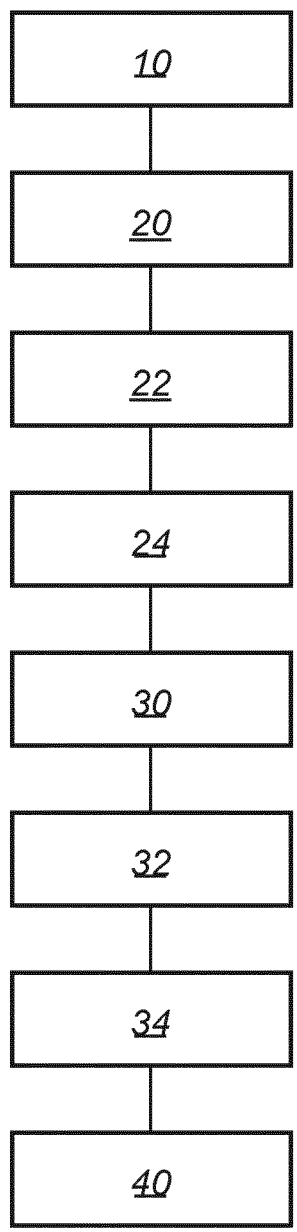
FIG. 5 schematically illustrate methods according to some embodiments.

A method for imaging a sample S by means of an X-ray detector D will now be described with reference to FIG. 5. The method may be performed by means of an imaging system according to any of the previously disclosed embodiments. The method may comprise providing 10 an electron beam 112 interacting with a target T to generate X-ray radiation 120, providing 12 a detector D for receiving the X-ray radiation passing through the sample S, and moving 20 the sample S relative to the target T. The sample S may for example be moved 22 in a continuous movement during the capture of an entire sequence of images. During the movement of the sample S, the movement, and/or position of the sample may be measured 24, for example by means of an interferometer or by monitoring a position of a reference features provided on the sample itself, or for example on the sample holder. As the sample S is moved by the sample holder, the electron beam may be deflected 30 such that the X-ray spot is moved over the target T in accordance with the movement of the sample S. The electron beam may for example be deflected 32 such that the X-ray spot describes a sequence of scans over the target T, preferably while the sample S is moved at a substantially constant speed over the entire sequence. In an embodiment, the movement of the sample S may be measured 24 and the deflection of the electron beam adjusted 34 based on the measured sample movement. Finally, the X-ray radiation interacting with the sample S may be detected 40 by the detector, at which the X-ray radiation may describe an image of the inspection region 180 of the target T as projected onto an image plane of the detector D.

The invention claimed is:

1. A method for imaging a sample by means of an X-ray detector, comprising:
   providing an electron beam interacting with a target to generate X-ray radiation emitted from an X-ray spot on the target,
   moving the sample relative to the target,
   deflecting the electron beam such that the X-ray spot is moved over the target simultaneously and in accordance with the movement of the sample, and
   detecting X-ray radiation emitted from the X-ray spot and interacting with the sample.

2. The method according to claim 1, wherein the movement of the electron beam and the movement of the sample are coordinated such that an inspection region on the sample is irradiated by X-ray radiation during an exposure time defined by a scanning length of the electron beam on the target.

3. The method according to claim 2, further comprising deflecting the electron beam in a sequence of repeated scans, and moving the sample in a continuous movement during the entire sequence.

4. The method according to claim 3, comprising moving the sample with a substantially constant speed during the entire sequence.

5. The method according to claim 2, further comprising deflecting the electron beam so that an angle by which the X-ray radiation irradiates the sample is substantially maintained during the exposure time.

6. The method according to claim 2, further comprising deflecting the electron beam so that an image of the inspection region formed on the detector does not move substantially relative to the detector during the exposure time.

7. The method according to claim 1, further comprising measuring the movement of the sample and adjusting the deflection of the electron beam based on said movement.

8. The method according to claim 7, wherein said adjusting is performed such that a reference feature is maintained at a fixed location in an image plane of the detector while the electron beam is deflected.

9. An X-ray source for inspecting a moving sample, comprising:
   a target,
   an electron source configured to provide an electron beam interacting with the target to generate X-ray radiation emitted from an X-ray spot on the target, an electron optical system configured to deflect the electron beam over the target in a plurality of repeated scans, a controller operably connected to the electron optical system and configured to deflect the electron beam by means of the electron optical system and based on a signal indicative of the movement of the sample, such that the X-ray spot is moved on the target simultaneously and in accordance with the movement of the sample.

10. The X-ray source according to claim 9, wherein the controller is communicatively connected to an input port configured to receive the signal indicative of the movement of the sample.

11. The X-ray source according to claim 9 wherein the controller is configured to deflect the electron beam such that, for each scan, the sample is irradiated with X-ray radiation impinging on the sample at a substantially constant angle of incidence.

12. The X-ray source according to claim 9, wherein the controller is configured to deflect the electron beam such that, for each scan, an image of the sample formed in an image plane does not move in the image plane.

13. An imaging system for imaging a sample comprising:
an X-ray source according to claim 9,
a detector,
a sample holder configured to move the sample relative to the target, and
a position sensor arranged to provide data indicating the movement of the sample,
wherein the controller is arranged to adjust the deflection of the electron beam based on said data.

14. The imaging system according to claim 13, wherein the sample holder further comprises a reference feature configured to be detected by the position sensor.

15. The imaging system according to claim 13, wherein:
the electron optical system is configured to scan the electron beam over the target, and
the sample holder is configured to move the sample in a continuous movement during a scan of the electron beam.

* * * * *